Aug. 2, 1960

F. W. STEIN 2,947,940

TEST CELL

Filed Sept. 3, 1957

INVENTOR.
Frederick Stein

BY

ATTORNEY.

Aug. 2, 1960     F. W. STEIN     2,947,940
TEST CELL

Filed Sept. 3, 1957            2 Sheets-Sheet 2

INVENTOR.
Frederick Stein
BY
Thos. E. Scofield
ATTORNEY.

United States Patent Office 2,947,940
Patented Aug. 2, 1960

2,947,940
TEST CELL

Frederick W. Stein, Atchison, Kans., assignor to Fred Stein Laboratories, Inc., Atchison, Kans., a corporation of Kansas Filed Sept. 3, 1957, Ser. No. 681,676

3 Claims. (Cl. 324—65)

The invention relates to apparatus for performing electrical tests on fluent materials and refers more particularly to such apparatus designed to receive fluent materials from uniform fall producing apparatus.

An object of the invention is to provide an improved sample-receiving cell which can be used in conjunction with known test circuits to perform the desired tests on fluent material rapidly, efficiently and reliably.

Another object of the invention is to provide a test cell which can be loaded with the test material and unloaded very quickly, easily and efficiently; and in which tests on different specimens of a given material can be carried out successively in a relatively short time.

Another object of the invention is to provide such testing apparatus which is economical to manufacture, trouble free in operation and extremely easy to use in a manner which will give accurate and reliable results.

Another object of the invention is to provide apparatus for test cells employing a central post electrode and a peripheral tube electrode wherein the post is supported by the tube yet the support means offer a minimum obstruction and interference with the fall of the fluent material into the test cell, thus minimizing the variations in pack encountered with different samples.

Another object of the invention is to provide a test cell employing a central post electrode and a peripheral tube electrode with the post electrode supported by the tube, wherein the means for emptying the cell requires movement of neither of the electrodes, yet easily, quickly and conveniently empties the cell.

Another object of the invention is to provide a test cell having a central post electrode and a peripheral tube electrode wherein the post is supported by the tube and the means for emptying the cell occupy a minimum space and do not require movement of either the tube or the post.

Another object of the invention is to provide a test cell of extremely simple construction wherein all of the parts are readily accessible for cleaning or repair.

Another object of the invention is to provide a test cell with means for emptying the cell which always provides a uniform depth for the cell and wherein rough use and handling over a long period of time of the means for emptying the cell does not affect the depth of the cell when it is closed to receive a sample.

Another object of the invention is to provide a test cell wherein the means for emptying the cell has resilient means tending to maintain it in the closed position yet rough handling of the cell or long continued use of it will not either affect the proper closing of the cell or vary the depth of it when closed.

Other and further objects of the invention will appear in the course of the following description thereof.

In the drawings, which form a part of the instant specification and are to be read in conjunction therewith, embodiments of the invention are shown and, in the various views, like numerals are employed to indicate like parts.

Figure 1:
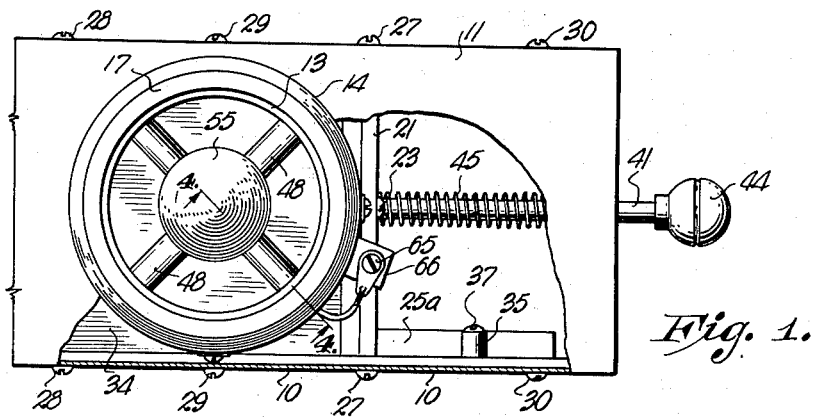
Fig. 1 is a top plan view of a first modification of the invention with parts cut away to show the construction of the apparatus.
Figure 2:
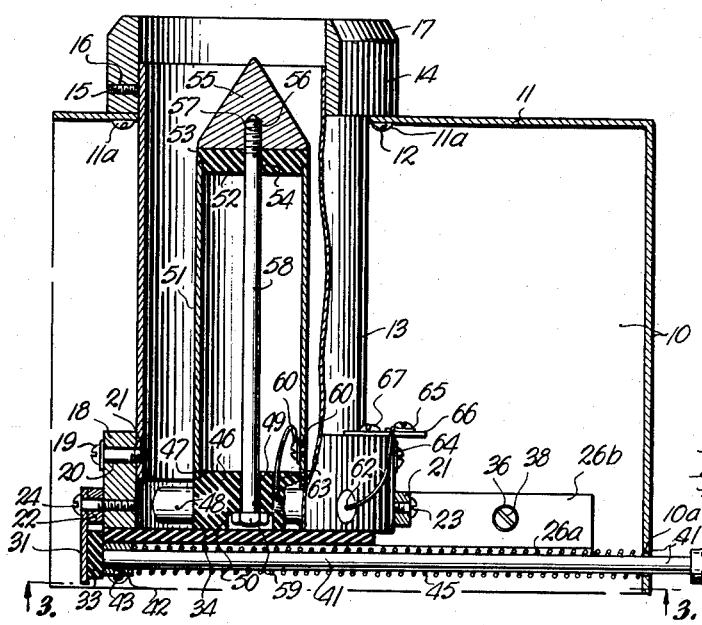
Fig. 2 is a side, partly sectional view through the apparatus of Fig. 1.

Referring to the first modification of the invention shown in Figs. 1–4, at 10 is shown the side walls of a rectangular housing having a top wall 11, the latter with an opening 12 therein, and one side wall having opening 10a therein. The housing is shown as rectangular in vertical cross section in Figs. 1 and 3. The lower end of the housing in Fig. 2 is shown as open and so it may be, if desired, but conventionally a removable, drawer-type grain box is mounted within the housing to receive tested material from the test cell after a grain sample or the like has been tested. Such latter construction is not shown as it does not comprise an integral part of the present invention. Cylindrical tube 13 of electricity conducting material extends through the opening 12 in the top wall 11 of the housing and is engaged at its upper end by upper ring 14 which is removably fixed thereon by means such as set screw 15 engaging threaded passage 16 extending through the ring 14. The upper outside face of the ring is preferably beveled, as at 17. Ring 14 tightly fits around the outer upper surface of the tube 13 and screws 11a are employed to fix ring 18 on the housing top surface 11.

The upper portion of lower ring 18 fits around the lower end of the tube 13 and is fixedly mounted relative thereto by means such as screws 19 (Figs. 2) received in openings 20 in ring 18 and threaded openings 21 extending into or through the tube 13. The inner ends of the screws 19 preferable do not extend past the inside face of the tube 13.

A frame for mounting a sliding door or panel relative the bottom face of ring 18 is fixedly mounted around the peripheral face of the ring 18 on the lower portion thereof. Transverse bars 21 and 22 are fixedly attached to the lower outer surface of the ring 18 by screws 23 and 24, respectively. Bars 21 and 22 are positioned at least substantially parallel one to the other. Longitudinal L-shaped members 25 and 26 are fixedly attached to the ends of bars 21 and 22, as well as side walls 10, by sets of screws 27 and 28, respectively, and to opposite sides of the outside face of ring 18 by a set 29 of screws which also engage side walls 10. Members 25 and 26 have horizontal flanges 25a and 26a and vertical flanges 26b and 25b. Set 30 of screws connects the ends of the members 25 and 26 to the housing side wall 10. Stop plate 31 is fixed to the outer face of bar 22 by set 32 of screws as well as screw 20 and has buffer 33 of rubber or other resilient material fixed to the lower inside surface thereof. Buffer 33 is preferably of a thickness substantially that of bar 22.

Test cell door or panel 34 is slidably mounted on top of the horizontal flanges 25a and 26a below the bottom face of ring 18. The length and breadth of the door 34 is sufficiently great that the opening of ring 18 is completely closed off when the end of the door 34 abuts the buffer 33. The top surfaces of the horizontal flanges 25a and 26a are so spaced from the undersurface of the ring 18 that the door 34 has a frictional but sliding fit against the underside of the ring 18. The side edges of the door 34 have an easy sliding fit against the upwardly extending flanges 25b and 26b. Panel retainer sleeves 35 and 36 are fixed by screws 37 and 38 to the inside faces of the upwardly extending flanges 25b and 26b, respectively, and have their lowermost portions spaced above the horizontal flanges 25a and 26a a distance substantially that of the distance from the bottom face of the ring 18 to the upper surfaces of the horizontal flanges 25a and 26a. Thus the sleeves 35 and 36 maintain the door 34 flat against the upper surfaces of the flanges 25a and 26a when the panel is not closing off ring 18. Block 39 is fixed to the lower side of door 34 by screws 40 adjacent one end of the panel preferably having one side face thereof in line with the end face thereof. Rod 41 extends into opening 42 extending into the block 39 and is fixed therein by set screw 43. Rod 41 is of sufficient length that when one end thereof is abutting the buffer 33, the other end extends through the opening 10a in the side wall 10 of the housing. Rod 41 preferably has handling knob 44 on the free end thereof. Resilient coil spring 45 encircles rod 41 and abuts with one end thereof the face of block 39 and with the other end the inside face of the housing wall 10 adjacent the opening 10a. Spring 45 always tends to maintain the door 34 in position against the buffer 33 to close off the opening of the ring 18. Cylinder 13 must be so spaced from the housing side wall 10 containing the opening 10a that, when the door 34 is moved entirely to the right in Fig. 2 whereby to abut with one end thereof the inside face of the side wall 10, the opening of the ring 18 is completely unobstructed so that any material within the ring 18 or tube 13 will fall out past the panel 34.

A block of electrical insulating material 46 (such as Bakelite, etc.) having a notch 47 formed in the upper peripheral edge thereof is fixedly mounted inside of ring 18 by four equally spaced horizontal posts or spokes 48. Spokes 48 each are fixed into and preferably extend through openings in the ring 18 at one end thereof and into recesses in the block 46 at the other. Block 46 also has opening 49 extending therethrough with recess 50 in the underside thereof. Cylindrical tube 51 of electricity conducting material is mounted at its lower end in the notch 47 with its outside face flush with the cylindrical block 46 and itself mounts second insulating piece 52 having notch 53 in its lower peripheral edge. Opening 54 extends through secondary block 52. Cone tip 55 of electricity conducting material like that of tube 51 has threaded opening 56 in the underside thereof engageable by threaded portion 57 of rod 58 which has head 59 thereof receivable in recess 50. The central electrode post assembly is formed by fitting tube 51 into the notch 47, secondary block 52 over tube 51 and cone tip 55 on the block 52 with rod 59 engaging, through opening 54 in block 52, the cone tip, to hold the whole assembly rigidly together. Thus spokes 48 rigidly mount block 46 relative the ring 18 and tube 13 and rod 58 holds the center post assembly rigidly on block 46.

Figure 4:
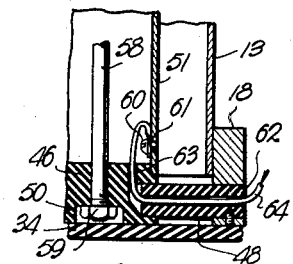
Fig. 4 is a view taken along the lines 4—4 of Fig. 1 in the direction of the arrows.
Figure 3:
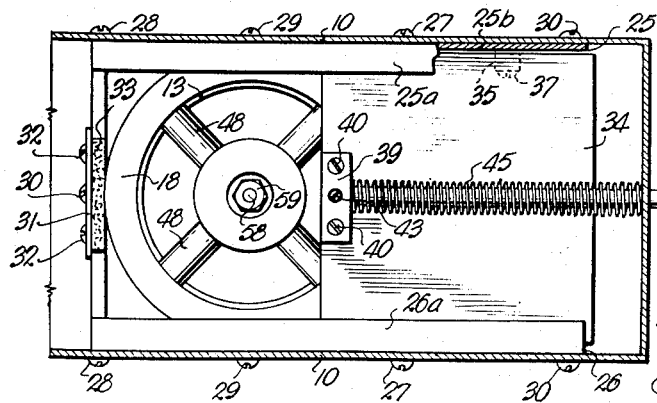
Fig. 3 is a bottom plan view of the apparatus of Fig. 1 with the full line showing of the apparatus partly opened with a dotted line showing of a portion of the apparatus in closed position.
Figure 5:
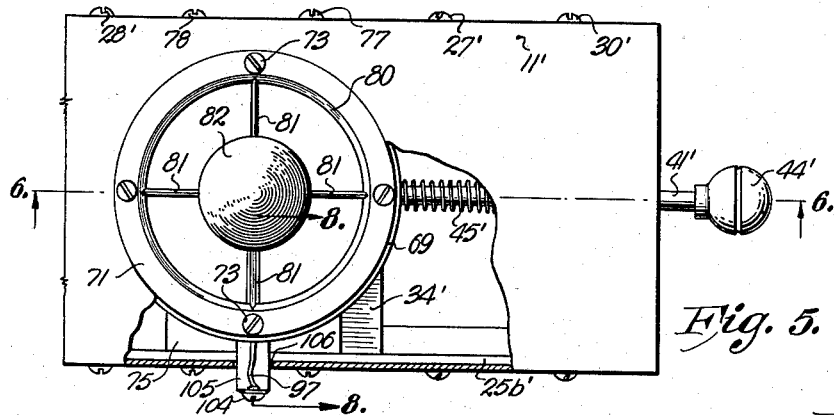
Fig. 5 is a top plan view with parts cut away of a second modification of the invention.
Figure 6:
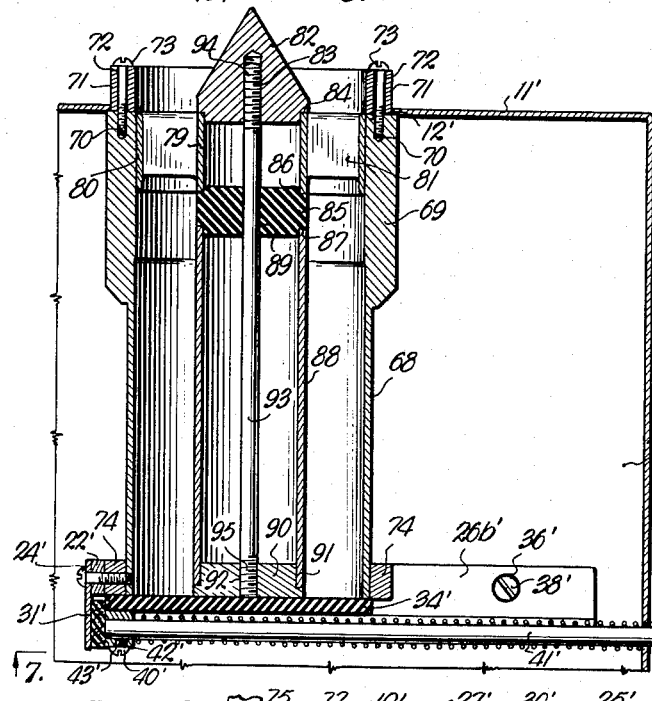
Fig. 6 is a view taken along the lines 6—6 of Fig. 5 in the direction of the arrows.

Referring to Figs. 2 and 4, screw 60 is received in threaded opening 61 in tube 51. One of the spokes 48 has passage 62 extending therethrough into block 46 from which passage 63 extends forwardly further into the block and then upwardly out of the upper surface thereof. Electrical conductor 64 is connected by screw 60 to conducting post 51 and passes through passages 63 and 62 externally of the ring 18 to post connection 65 on plate 66.

Plate 66 is secured to the top surface of the ring 18 by screw 67. Plate 66 is insulated from ring 18 or of insulating material. The electrical circuit to be employed with this test cell is not a part of the instant invention and thus will not be described, however, the circuit shown in my Patent No. 2,251,641, entitled, "Apparatus for Testing Materials," issued August 5, 1941, is operable with this device for the purposes described in that patent.

The test cell just described is designed to preferably work in conjunction with a test cell releasing device of the character described in my application Serial No. 681,742, filed September 3, 1957 entitled, "Test Cell Release Loading Device." The latter mechanism is intended to achieve an even, free fall of the material to be tested into the testing cell just described. This described first modification of the present invention is designed for testing the moisture content, etc., of whole grain materials of a nonabrasive character such as corn. Thus, sand, hard ground corn, coarse ground chops, crushed rock, etc., are not preferably tested in a device of this character. The absence of spokes supporting the upper portions central electrode permits an undisturbed uniform fall of the material to be tested into the testing cylinder 13. Spokes 48 at the bottom of the cell, of course, disturb to some extent a uniform fall and pack into this area, but the testing area of the cell is limited to between tube 13 and tube 51 above block 46. Thus, by providing the insulated block 46 of a height greater than the diameter of spokes 48, testing of the area around the spokes is avoided and the irregularity of the corner falls becomes unimportant.

It is of extreme importance that the test cell has a uniform depth from test to test. Panel 34 provides such a constant uniform depth for the cell. The bottom surface of the block 46 is almost flush with the bottom surface of the ring 18 so that panel 34, when closed, contacts the bottom of the ring 18 and very nearly that of block 46. (Preferable clearance is 1/64 inch.) Fatigue of spring 45 does not affect the depth of the test cell. Once the sample has been dropped into the test cell, the appropriate electrical potential is applied across the cell in the manner disclosed in my Patent No. 2,251,641, above. Rod 41 is then pulled outwardly from the housing side wall 10 by grasping knob 44, thus sliding panel 34 to the right in Fig. 2. Material which has been tested in the cell falls out as the door retracts and, as it retracts fully from the opening of the ring 18, all of the material in the cell can fall free. Spring 45 returns panel 34 to abutment with buffer 33 and the test cell is again sealed in its bottom end for the receipt of another sample.

Referring now to the second modification of the invention shown in Figs. 5–9, all parts which are identical in construction with corresponding parts of the first modification of the invention are numbered the same as in Figs. 1–4 but are primed. Parts which are different in construction are given new numbers to clearly bring out the differences between the two modifications.

At 10' are shown the side walls of a housing having a top wall 11' with an opening 12' therein. Cylinder 68 has enlarged upper portion 69 with threaded screw openings 70 in the upper ends thereof. Upwardly extending ring 71, having screw passages 72 extending vertically therethrough, is of lesser outer diameter than the thickened portions 69 of the cylinder 68 and rests on the top edge of the latter, fixed thereto by screws 73. Opening 12' is of only slightly greater diameter than the outside diameter of ring 71 whereby to fit closely therearound. Ring 74 fits on and around the lower outside surface of the cylinder 68 adjacent the lower edge thereof. Bar 22' is fixed to the side walls 10' of the housing by screws 28'. L-shaped members 25' and 26' have lower horizontal flanges 25a' and 26a' and vertical flanges 25b' and 26b'. Engaging pieces 75 and 76 fit against opposite sides of ring 74. Sets 77 and 78 of screws extend through and engage the upper flanges 25b' and 26b', the members 75 and 76 and the ring 74, as well as the side walls 10' of the housing. Screw sets 27' and 30' engage the flanges 25b' and 26b' with the side walls 10 as well. Buffer plate 31' is fixed by screw 24' to bar 22', ring 74 and cylinder 68. Screws 32' also aid in fixing the plate 31' to the bar 22'. Buffer 33' is fixed to the lower inside surface of plate 31'.

Panel 34' is regulated in its open position by sleeves 35' (not shown) and 36', the latter engaged and held in place relative flange 26b' by screw 38'. Block 39' is fixed by screws 40' to the underside of panel 34' and receives rod 41' in opening 42', with set screw 43' fixing the end of the rod 41' in place in the block 39'. Knob 44' is fixed to the free end of rod 41'. Resilient coil spring 45' encircles the rod 41' and extends between the block 39' and the inner surface of wall 10'.

Concentric rings 79 and 80 are fixed to one another and spaced relative one another by flanges or spokes 81. The outer ring 80 is slidably insertable within ring 71 and the upper portion of cylinder 68 and may be fixed relative thereto by set screws 81 (Fig. 8) inserted through the thickened portion 69 of cylinder 68. Cone 82, having threaded opening 83 centrally of the lower edge thereof, is fixed by means of notches 84 to the top of inner ring 79. Electrical insulating block 85, having upper and lower notches 86 and 87 around the upper and lower edges thereof, engages ring 79 with the notch 86 and cylindrical tube electrode 88 with notch 87. Insulating block 85 is of Bakelite, rubber or other insulating electrical material and has opening 89 extending therethrough. Lower insulating block 90 has elongated notch 91 in the upper peripheral edge thereof to receive the lower end of the tube 88 and also has opening 92 extending centrally therethrough to receive rod 93. Rod 93 has threaded upper end 94 to engage threaded opening 83 and threaded lower portion 95 to engage threaded opening 92 in insulating piece 90. Flanges 81 thus support the entire assembly of cone 82, ring 79, upper insulating piece 85, cone 88 and lower insulating piece 90, as well as the connecting rod 93.

The lower surface of lower insulating piece 90 should not be positioned more than 1/64 inch above the level of the lower edge of tube 68 so that the panel 34' will be substantially flush therewith when it is closed. The distance from the tube 68 to the side wall 10' of the housing having opening 10a' therein must be of the same order as in the previous modification to permit complete opening of the annulus between tubes 68 and 88.

Figure 8:
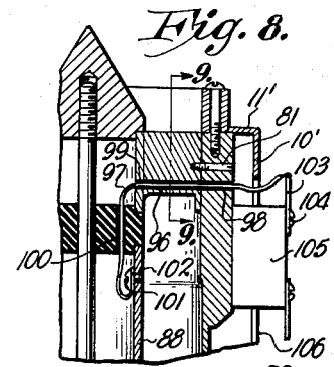
Fig. 8 is a view taken along the lines 8—8 of Fig. 5 in the direction of the arrows.
Figure 9:
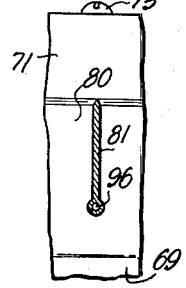
Fig. 9 is a view taken along the lines 9—9 of Fig. 8 in the direction of the arrows.
Figure 7:
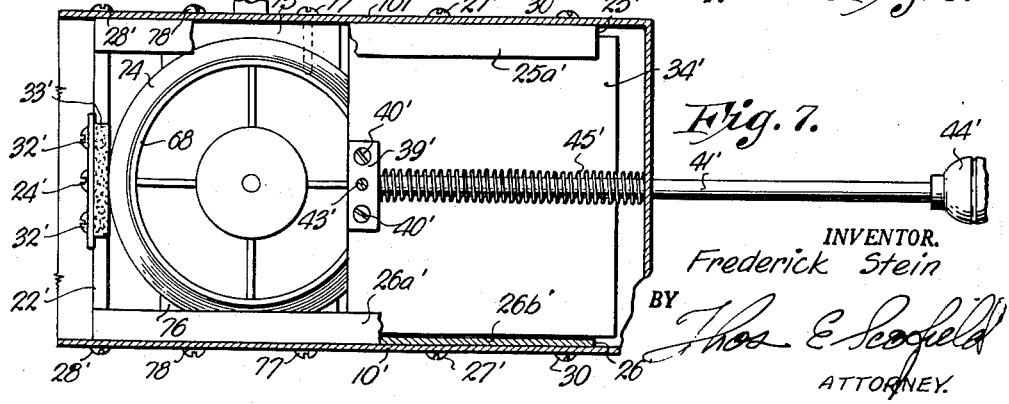
Fig. 7 is a view taken along the lines 7—7 of Fig. 6 in the direction of the arrows with the apparatus shown in full lines in open position, the showing of Fig. 6 being in closed position.

Referring now to Figs. 8 and 9, one flange or spoke 81 has passage 96 formed through the lower enlarged edge thereof to receive electrical conduit 97. Passage 98 is formed in the wall of enlarged portion 69 of tube 68 and like passages 99 and 100 through inner ring 79 and upper insulating piece 85 for the extension of conduit 97. An electrical connection to electrode tube 88 is made by means of screw 101 engaging threaded opening 102 in tube 88. The other end of the conduit 97 is attached to conductor 103 fixed by screw 104 to insulating block 105 of Bakelite or other electrical insulating material such as hard rubber. Insulator 105 extends through an opening 106 in a side wall 10' of the housing.

The test cell of Figs. 5–9, inclusive, tests across the entire height of electrode 88 and there is no bottom area which is excluded from such test of the magnitude of the area excluded from testing in the first modification of the invention. However, the fall into the second modification of the invention is not undisturbed in the upper reaches of the test cell due to the presence of flanges 81. The enlarged portion of one of the flanges 81 to receive conduit 96, as in Fig. 9, does not more seriously disturb the fall of the materials into the cell than spokes 81 themselves. The operation of panel 34' is the same as described relative door 34 in the first modification. Panel 34 always gives a uniform depth to the cell and rough handling will not affect whethehr or not the slide will close adequately over a period of time. Fatigue of spring 45' will not affect the depth. The Figs. 5–9 cell is adapted for testing soils, sands, coal and other abrasive materials which would not be properly testable in the modification of Figs. 1–4.

From the foregoing it will be seen that this invention is one well adapted to attain all of the ends and objects hereinabove set forth together with other advantages which are obvious and which are inherent to the structure.

It will be understood that certain features and subcombinations are of utility and may be employed without references to other features and subcombinations. This is contemplated by and is within the scope of the claims.

As many possible embodiments may be made of the invention without departing from the scope thereof, it is to be understood that all matter herein set forth is to be interpreted as illustrative and not in a limiting sense.

Having thus described my invention, I claim:

1. In a test cell for fluent materials, a pair of spaced apart electrodes, one comprising an upright post and the other comprising a tube coaxial with said post, a portion of the post at one of its extremities insulated from the remainder thereof, rib means for rigidly supporting said post within said tube communicating between the insulated portion of the post and the tube, an electrical connection to the noninsulated portion of the post within said supporting means, the bottom of said post level with the bottom of said tube, a door operable to slide relative to the bottoms of the tube and post to open and close off the lower end of the annular space therebetween, means resiliently biasing said door to the closed position and means receiving said door for sliding motion relative said tube and post.

2. A test cell as in claim 1 wherein the insulated portion of the post defines the upper operating end of the post electrode, the supporting means comprises at least one fin extending between and connected to the insulated portion of the post and the inner wall of the tube, and a passage is formed in said fin between the upper and lower edges thereof extending through the tube wall and the wall of the insulated portion of the post and the electrical connection to the noninsulated portion of the post extends through said passage.

3. A test cell as in claim 1 wherein the insulated portion of the post defines the lower operating end of the post electrode, the supporting means comprises at least one arm extending between and connected to the insulated portion of the post and the inner wall of the tube, and a passage is formed through the wall of the tube extending through the arm and the insulated portion of the post and the electrical connection to the noninsulated portion of the post extends therethrough.

References Cited in the file of this patent

UNITED STATES PATENTS

| 2,693,575 | Greenwood et al. | Nov. 2, 1954 |
| 2,759,147 | Stein | Aug. 14, 1956 |
| 2,825,870 | Hart | Mar. 9, 1958 |

FOREIGN PATENTS

| 116,478 | Australia | Feb. 4, 1943 |